US007697807B2

(12) United States Patent
D'urso et al.

(10) Patent No.: US 7,697,807 B2
(45) Date of Patent: Apr. 13, 2010

(54) MULTI-TIPPED OPTICAL COMPONENT

(75) Inventors: Brian R D'urso, Clinton, TN (US); John T Simpson, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 553 days.

(21) Appl. No.: 11/421,547

(22) Filed: Jun. 1, 2006

(65) Prior Publication Data
US 2007/0281130 A1    Dec. 6, 2007

(51) Int. Cl.
*G02B 6/26* (2006.01)
(52) U.S. Cl. ........................... 385/115; 359/361
(58) Field of Classification Search ............ 385/15, 385/39, 115, 116, 117
See application file for complete search history.

(56) References Cited

U.S. PATENT DOCUMENTS

| | | | | |
|---|---|---|---|---|
| 5,141,312 A | * | 8/1992 | Thompson et al. | 356/218 |
| 5,192,278 A | * | 3/1993 | Hayes et al. | 606/15 |
| 5,244,636 A | * | 9/1993 | Walt et al. | 422/82.07 |
| 5,332,681 A | * | 7/1994 | Tonucci et al. | 438/493 |
| 5,633,972 A | * | 5/1997 | Walt et al. | 385/116 |
| 5,664,036 A | * | 9/1997 | Islam | 385/31 |
| 5,690,894 A | * | 11/1997 | Pinkel et al. | 506/23 |
| 5,837,196 A | * | 11/1998 | Pinkel et al. | 422/55 |
| 5,859,937 A | * | 1/1999 | Nomura | 385/12 |
| 5,952,665 A | * | 9/1999 | Bhargava | 250/483.1 |
| 6,014,251 A | * | 1/2000 | Rosenberg et al. | 359/350 |
| 6,023,540 A | * | 2/2000 | Walt et al. | 385/12 |
| 6,146,593 A | * | 11/2000 | Pinkel et al. | 422/68.1 |
| 6,231,744 B1 | * | 5/2001 | Ying et al. | 205/324 |
| 6,266,459 B1 | * | 7/2001 | Walt et al. | 385/12 |
| 6,327,410 B1 | * | 12/2001 | Walt et al. | 385/115 |
| 6,406,845 B1 | * | 6/2002 | Walt et al. | 435/6 |
| 6,417,506 B1 | * | 7/2002 | Pinkel et al. | 250/216 |

(Continued)

FOREIGN PATENT DOCUMENTS

WO    WO 99/64909    12/1999

OTHER PUBLICATIONS

Tong et al. "Optical silica nanowires for nanophotonics," 2005, ICO20: Materials and nanotechnologies, Proc. Of SPIE, V. 6029, pp. 60290A-1-60290A-6.*

(Continued)

*Primary Examiner*—Frank G Font
*Assistant Examiner*—Peter Radkowski
(74) *Attorney, Agent, or Firm*—Novak Druce + Quigg; Gregory A. Nelson; Gregory M. Lefkowitz

(57) ABSTRACT

An optical component includes a support structure having a first composition including a recessive phase material and a second composition including protrusive phase material, the protrusive phase material defining a plurality of spaced apart surface features, each of the surface features comprising a distal end opposite the support structure, integrated with the support structure, and protruding distally from a surface of the support structure, each of the surface features reducing in cross sectional area distally from the support structure to provide a lowest cross sectional area at the distal end, the recessive phase material supporting and separating the surface features and defining a contiguous recessed surface area between the surface features, at least two of the protrusive features being characterized as optical waveguides.

16 Claims, 3 Drawing Sheets

U.S. PATENT DOCUMENTS

| | | | |
|---|---|---|---|
| 6,482,593 B2* | 11/2002 | Walt et al. | 435/6 |
| 6,483,640 B1* | 11/2002 | Tonucci et al. | 359/361 |
| 6,795,617 B2* | 9/2004 | Dinu et al. | 385/42 |
| 6,813,402 B2* | 11/2004 | Narita et al. | 385/12 |
| 6,853,786 B2* | 2/2005 | Russell et al. | 385/125 |
| 6,859,570 B2* | 2/2005 | Walt et al. | 385/12 |
| 6,890,764 B2* | 5/2005 | Chee et al. | 436/518 |
| 6,893,816 B1* | 5/2005 | Beattie | 435/6 |
| 6,931,177 B2* | 8/2005 | Suzuki et al. | 385/33 |
| 6,934,443 B2* | 8/2005 | Hikichi et al. | 385/31 |
| 6,960,528 B2* | 11/2005 | Chen et al. | 438/695 |
| 7,006,741 B1* | 2/2006 | Yu | 385/121 |
| 7,031,566 B2* | 4/2006 | Kochergin et al. | 385/27 |
| 7,057,832 B2* | 6/2006 | Wu et al. | 359/811 |
| 7,060,431 B2* | 6/2006 | Chee et al. | 435/6 |
| 7,167,615 B1* | 1/2007 | Wawro et al. | 385/37 |
| 7,167,622 B2* | 1/2007 | Temelkuran et al. | 385/123 |
| 7,258,731 B2* | 8/2007 | D'Urso et al. | 106/2 |
| 7,348,181 B2* | 3/2008 | Walt et al. | 436/172 |
| 7,384,797 B1* | 6/2008 | Blair | 436/524 |
| 7,394,547 B2* | 7/2008 | Tan et al. | 356/480 |
| 7,400,399 B2* | 7/2008 | Wawro et al. | 356/328 |
| 7,405,034 B2* | 7/2008 | Yan et al. | 430/312 |
| 7,421,173 B2* | 9/2008 | Mazur et al. | 385/123 |
| 2001/0029049 A1* | 10/2001 | Walt et al. | 436/518 |
| 2002/0009719 A1* | 1/2002 | Walt et al. | 435/6 |
| 2002/0150909 A1* | 10/2002 | Stuelpnagel et al. | 435/6 |
| 2002/0154882 A1* | 10/2002 | Moran | 385/137 |
| 2002/0171029 A1* | 11/2002 | Wolff | 250/201.3 |
| 2002/0176646 A1* | 11/2002 | Wu et al. | 385/12 |
| 2003/0044855 A1* | 3/2003 | Anderson et al. | 435/7.9 |
| 2003/0077058 A1* | 4/2003 | Russell et al. | 385/125 |
| 2003/0094035 A1* | 5/2003 | Mitchell | 73/105 |
| 2003/0174992 A1* | 9/2003 | Levene et al. | 385/129 |
| 2003/0207326 A1* | 11/2003 | Su et al. | 435/7.1 |
| 2003/0230118 A1* | 12/2003 | Dawes et al. | 65/379 |
| 2004/0004779 A1* | 1/2004 | Kochergin et al. | 359/885 |
| 2004/0028875 A1* | 2/2004 | Van Rijn et al. | 428/98 |
| 2004/0045932 A1* | 3/2004 | Kochergin et al. | 216/59 |
| 2004/0093906 A1* | 5/2004 | Gerstner et al. | 65/409 |
| 2004/0242023 A1* | 12/2004 | Yan et al. | 438/780 |
| 2004/0254457 A1* | 12/2004 | van der Weide | 600/430 |
| 2005/0013536 A1* | 1/2005 | Walt | 385/27 |
| 2005/0072192 A1* | 4/2005 | Arimondi et al. | 65/393 |
| 2005/0174425 A1* | 8/2005 | Harris | 348/45 |
| 2005/0191774 A1* | 9/2005 | Li et al. | 438/22 |
| 2005/0207713 A1* | 9/2005 | Mazur et al. | 385/123 |
| 2005/0221279 A1* | 10/2005 | Carter et al. | 435/4 |
| 2006/0024478 A1 | 2/2006 | D'Urso et al. | |
| 2007/0123776 A1* | 5/2007 | Aharoni et al. | 600/437 |
| 2007/0138376 A1 | 6/2007 | Naughton et al. | |
| 2007/0154154 A1* | 7/2007 | Falkenstein et al. | 385/125 |
| 2007/0281130 A1 | 12/2007 | D'Urso et al. | |

OTHER PUBLICATIONS

Chang et al. "Nanofiber optic sensor based on the excitation of surface plasmon wave near fiber tip," 2006, Journal of Biomedical Optics, V. 11, N.1, pp. 014032-1-014032-5.*

Tong et al., "Subwavelength-diameter silica wires for microscale optical components," 2005, Optical Components and Materials II, Proc. of SPIE V.5723, pp. 105-112.*

Liu et al, "Fabrication of Anodic-Alumina Films with Custom-Designed Arrays of Nanochannels," 2005, Adv. Mater., V. 17, N. 2, pp. 222-225.*

Tong et al. "Submicron and nano-diameter silica wires for optical wave guiding," 2002, Nano-Optics and Nano-Structures, Proc. Of SPIE V. 4923, pp. 52-58.*

Tong et al., "Modeling of subwavelength-diameter optical wire waveguides for optical sensing applications," 2005, Advanced Sensor Systems and Applications II, Proceedings of SPIE, V. 5634, pp. 416-423.*

Mazur, E., "Silica nanowires manipulating light at the nanoscale," LASE 2006 Conference Abstract 6107-21, Session 5, p. 97.*

* cited by examiner

MULTI-TIPPED OPTICAL COMPONENT

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

CROSS-REFERENCE TO RELATED APPLICATIONS

Specifically referenced are: U.S. patent application Ser. No. 10/900,248 filed on Jul. 27, 2004 by D'Urso and Simpson entitled "Composite, Ordered Material Having Sharp Surface Features", the entire disclosure of which is incorporated herein by reference; and U.S. patent application Ser. No. 10/900,249 filed on Jul. 27, 2004 by D'Urso and Simpson entitled "Composite, Nanostructured, Super-Hydrophobic Material", the entire disclosure of which is incorporated herein by reference.

BACKGROUND OF THE INVENTION

Tapering an optical waveguide (also known in many instances as an optical fiber) below its transmission cutoff diameter causes the propagating light to form an evanescent field at the waveguide tip. If nothing couples to this evanescent field, the propagating light undergoes total internal reflection (TIR) and returns to the light source. If any evanescent field coupling occurs the amount of reflected light is proportionally reduced. Near-field scanning optical microscopy (NSOM) uses this phenomenon to achieve spatial resolution performance beyond the classical diffraction limit by employing a sub-wavelength light source or detector positioned in close proximity to a specimen. Individual optical waveguides have been drawn down to approximately 100 nm and addressed optically as microscopy or sensor probes. Scanning a large area with such probes is time consuming because of the small size of the probes.

BRIEF SUMMARY OF THE INVENTION

In accordance with one aspect of the present invention, the foregoing and other objects are achieved by an optical component that includes a support structure having a first composition including a recessive phase material and a second composition including protrusive phase material, the protrusive phase material defining a plurality of spaced apart surface features, each of the surface features comprising a distal end opposite the support structure, integrated with the support structure, and protruding distally from a surface of the support structure, each of the surface features reducing in cross sectional area distally from the support structure to provide a lowest cross sectional area at the distal end, the recessive phase material supporting and separating the surface features and defining a contiguous recessed surface area between the surface features, at least two of the protrusive features being characterized as optical waveguides.

In accordance with another aspect of the present invention, an optical instrument includes: an optical component that includes a support structure having a first composition including a recessive phase material and a second composition including protrusive phase material, the protrusive phase material defining a plurality of spaced apart surface features, each of the surface features comprising a distal end opposite the support structure, integrated with the support structure, and protruding distally from a surface of the support structure, each of the surface features reducing in cross sectional area distally from the support structure to provide a lowest cross sectional area at the distal end, the recessive phase material supporting and separating the surface features and defining a contiguous recessed surface area between the surface features, at least two of the protrusive features being characterized as optical waveguides; a light source for illuminating a sample so that light interacts with the sample and enters the optical component through the protrusive features at the distal end of the optical component; and a detector in optical communication with a proximal end of the optical component for converting a light signal propagated through the optical component into an electrical signal.

For a better understanding of the present invention, together with other and further objects, advantages and capabilities thereof, reference is made to the following disclosure and appended claims in connection with the above-described drawings.

DETAILED DESCRIPTION OF THE INVENTION

The invention provides an optical component characterized by an individually addressed ordered array of optical waveguides (probes). Thus, a larger area can be probed at once with exceptional spatial resolution.

Figure 1:
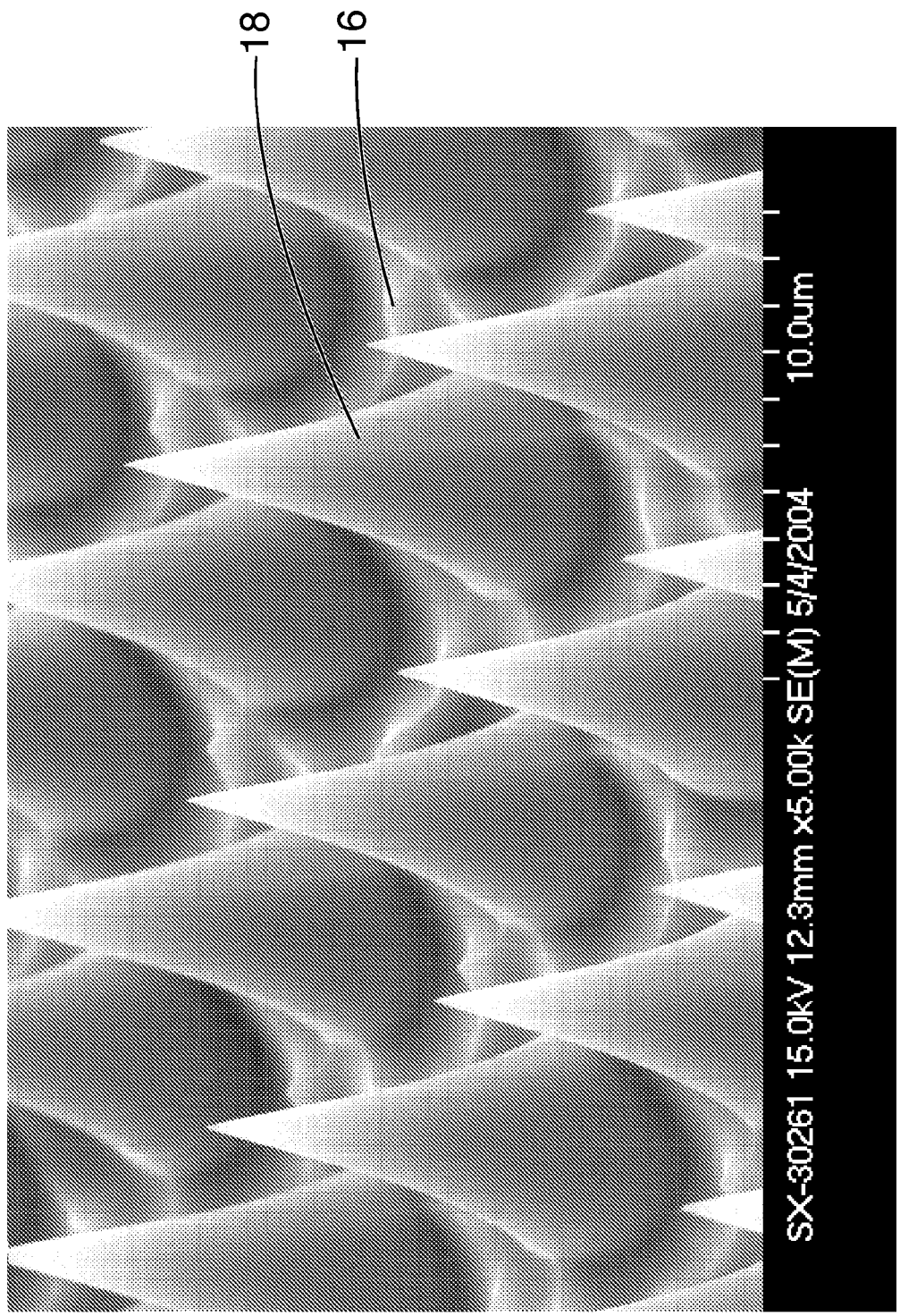
FIG. 1 is an oblique photomicrograph of a spiked glass plate after etching in accordance with the present invention.

U.S. patent application Ser. No. 10/900,248, referenced hereinabove, provides teachings that relate to differentially etched, ordered materials having sharp surface features. FIG. 1 shows an embodiment of that invention having recessive areas of recessive phase 16 and spikes of protrusive phase 18.

In the present invention, protrusive phase 18 is characterized as an optical waveguide. Light of a preselected wavelength or range or wavelengths (infrared, visible, and/or ultraviolet light) may be transmitted through and guided in the protrusive phase 18. The differentially etched, composite, ordered material having sharp surface features can thus be used as an array of optically transmitting sharp points.

Figure 2:
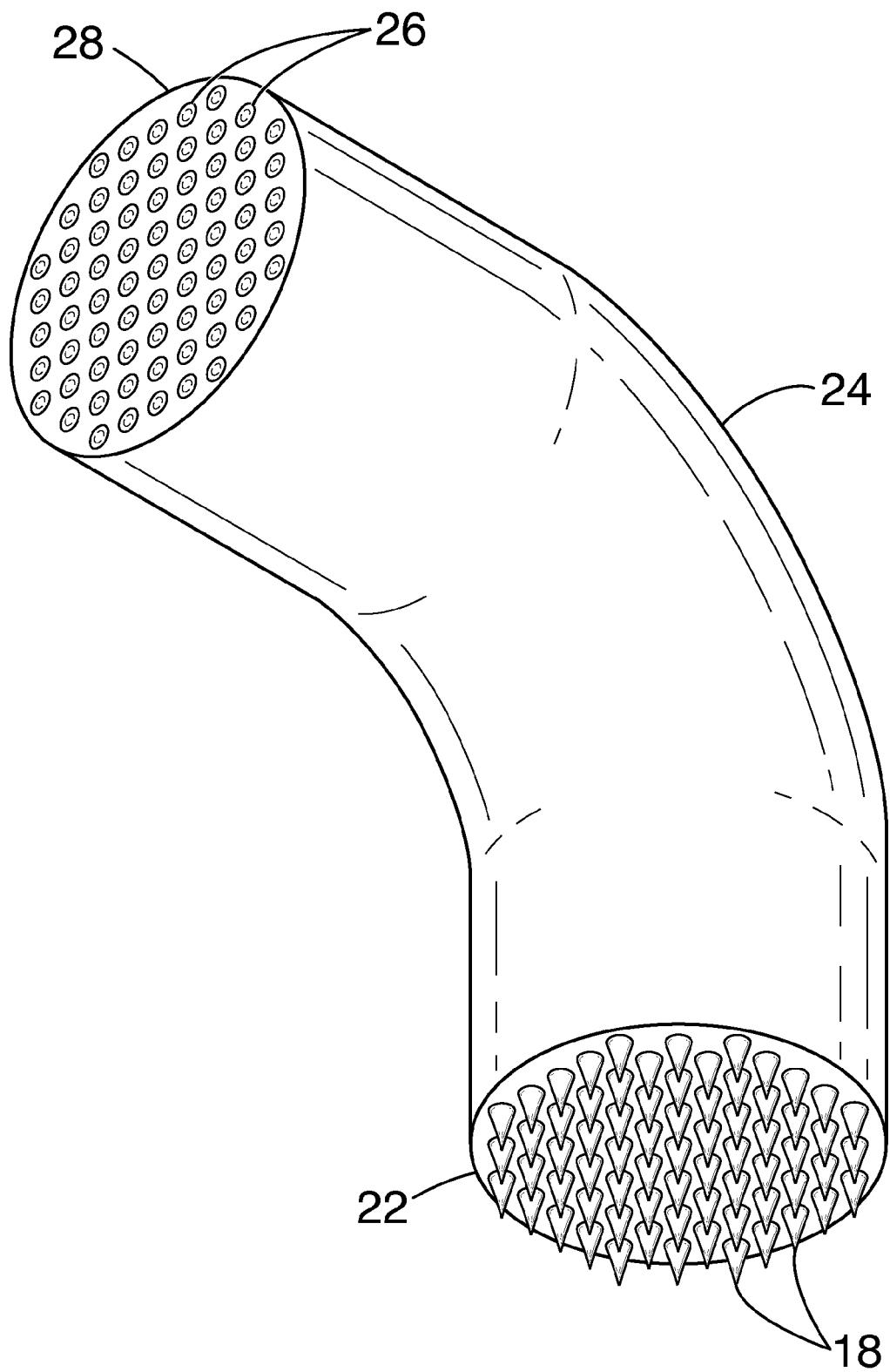
FIG. 2 is a not-to-scale schematic illustration of an optical component in accordance with the present invention.

FIG. 2 shows an optical component 24 having a distal end 22 that comprises an array of sharp surface features 18 (discrete spikes). Such an array can contain from as few as two total to more than one billion per square centimeter individual, parallel, sharp points that can be used as massively parallel sensors, parallel scanning optical microscopy probes, and the like. The optical component 24 can an optical fiber of any desired length and diameter, a plate or wafer of any desired thickness and diameter, or any other desired size and shape. The optical component 24 can be flexible or rigid, elastic or inelastic. The individual strands of protrusive phase that form the discrete spikes 18 run parallel and completely through the optical component 22 and are individually addressable as discrete areas 26 at a proximal end 28.

It can be understood from the description hereinabove that at least the protrusive phase must be sufficiently transparent at the preselected wavelength(s) to be characterized as an optical waveguide. For the purposes of describing the present invention, an optical waveguide is defined, as a material wherein the attenuation length of light of the preselected wavelength(s) is at least as long as the average length of the sharp surface features of the protrusive phase. It is preferable that the attenuation length of light of preselected wavelength(s) be at least ten times as long as the average length of the sharp surface features of the protrusive phase.

In various embodiments of the present invention, it may be preferable that both the protrusive and recessive phases are characterized as optical waveguides at the preselected wavelengths. Moreover, in various embodiments of the present invention it may be preferable that the protrusive phase is noncontiguous so that protrusions can be individually optically addressed.

The preselected wavelengths of light are guided (confined) through the protrusive phase. The preferred mechanism for guiding is for the protrusive phase to be characterized by a higher index of refraction than the recessive phase for at least one preselected wavelength of light, more likely a range or a group of preselected wavelengths of light. The protrusive phase is thus an optical fiber, acting as a waveguide for the preselected wavelength(s) of light. Alternatively, the recessive phase can be reflective at the preselected wavelengths (for example, the recessive phase can be metallic), thus confining the preselected wavelengths of light to the protrusive phase.

For some applications, it may be desirable to produce the material in the form of a long glass fiber with the protrusive surface features at the end of the fiber to transmit the preselected wavelengths of light over a distance through the protrusive phase. Moreover, it may be desirable to produce a tapered fiber with the sharp surface features on the tapered end so that the protrusive phase (rods or waveguides) may be easily individually addressed at the large end. Such fibers are particularly easy to produce if the material is produced by drawing and bundling glass fibers as described previously.

The present invention can be used in two basic modes. In a first mode of operation, light guided through the protrusive phase from the proximal end propagates to the sharp, protrusive features at the distal end, interacts with an analytical sample, and returns back through the protrusive phase to the proximal end as an optical data signal to a receiver or array of receivers at the proximal end. In a second mode of operation, light directed onto an analytical sample via another means interacts with the sample, is picked up by the sharp protrusive features at the distal end, and guided through the protrusive phase to a receiver or array of receivers at the proximal end.

It can thus be seen that the invention can be utilized in various optical instruments that operate in one or both of the above described modes. Potential applications of the present invention include analytical processes where small regions of space need to be optically probed, particularly in cases where it is desirable to probe many regions over an area simultaneously.

The distal end of the component can be coated with nanoparticles (for example silver nanoparticles) so that the component can be used for Surface Enhanced Raman Spectroscopy as a multi-tipped sensor or probe, with the possibility of spatially resolving the signal. Using the evanescent optical fields of each protrusive feature, an array of protrusive features can used instead of a single tip in a scanning probe optical microscope, thus gathering many data points in parallel and speeding up the image acquisition process.

As a fiber with sharp features on the end, the invention may be used as a biological probe and in particular an intracellular probe connected to an optical microscope or spectroscope.

In most configurations, instruments that utilize the optical component of the present invention may also include, but are not limited to: a light source for illuminating a sample so that light interacts with the sample and enters the optical component through the protrusive features at the distal end; a detector for converting a light signal propagated through the optical component into an electrical signal; various electrical components for supplying power to the instrument, controlling the instrument, processing the electrical signal into data, and displaying the data, and a support frame for supporting the optical component and generally at least some of the various components described herein.

Figure 3:
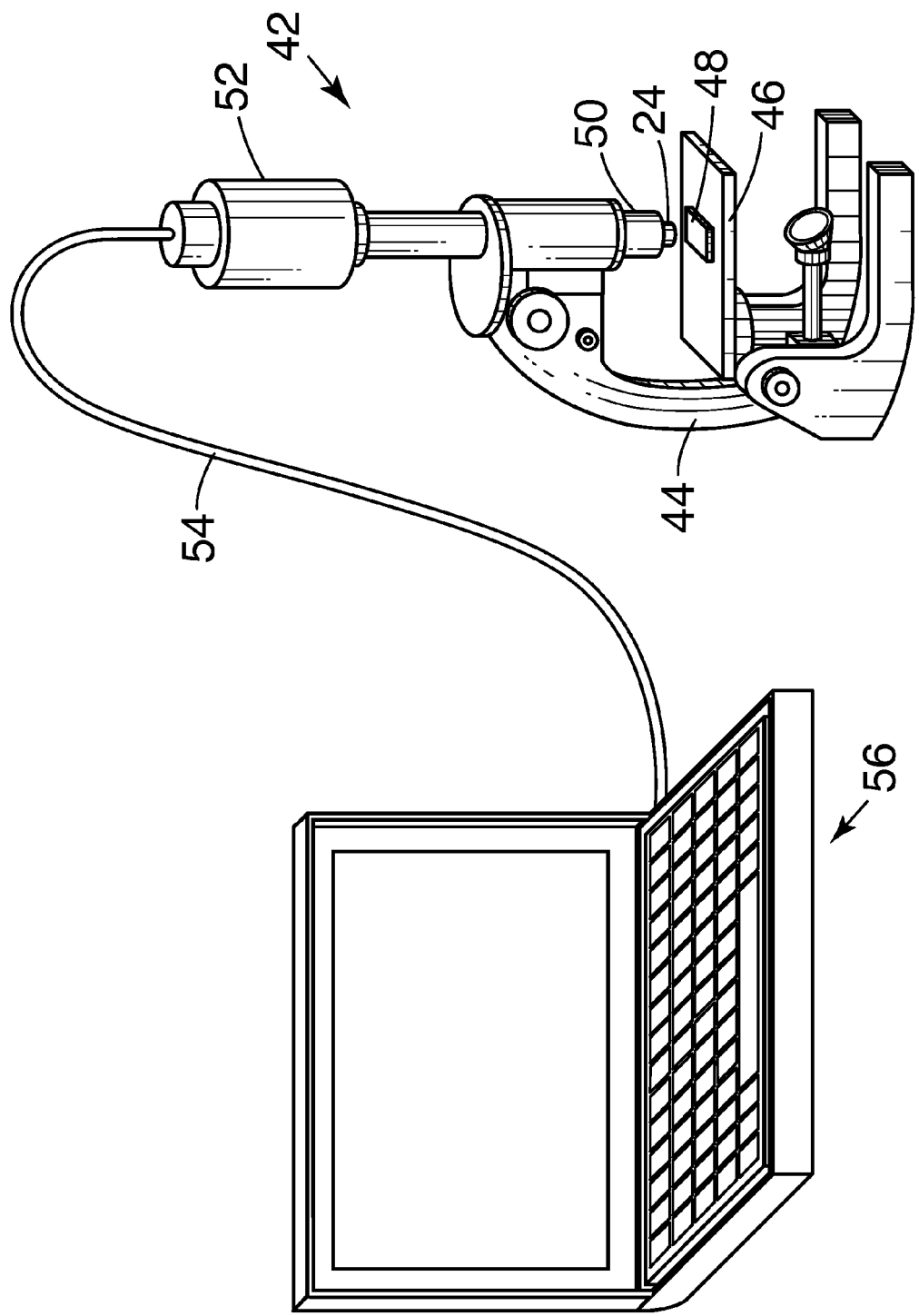
FIG. 3 is a not-to-scale schematic illustration of a near-field scanning optical microscope in accordance with the present invention.

One example of an instrument that utilizes the optical component of the present invention is near-field scanning optical microscope. Referring to FIG. 3, a near-field scanning optical microscope 42 can include an optical component 24 in accordance with the present invention. Briefly, a support frame 44 carries an X-axis and Y-axis traversable table 46 for supporting an analytical sample 48 to be inspected. The support frame 44 carries a Z-axis traversable nosepiece 50 for supporting a photo-detector 52 and the optical component 24, and for controlling the distance of the optical component 24 from the sample 48. The skilled artisan will recognize that traversability of the table 46 and nosepiece 50 can be interchangeable in any axis. The near-field scanning optical microscope 42 can be connected via a signal cable 54 to a data processing device such as a computer 56.

While there has been shown and described what are at present considered the preferred embodiments of the invention, it will be obvious to those skilled in the art that various changes and modifications can be prepared therein without departing from the scope of the inventions defined by the appended claims.

We claim:

1. An optical component comprising:
a support structure having a first composition including a recessive phase material and a second composition including protrusive phase material,
said protrusive phase material comprising a plurality of discrete, spaced apart optical fibers extending from a proximal end of said support structure to a distal end of said support structure, wherein each of said discrete, spaced apart optical fiber comprises a sharp surface feature extending from said distal end of said support structure, each of said sharp surface features comprising a distal end opposite said support structure, integrated with said support structure, and protruding distally from a surface of said distal end of said support structure, each of said sharp surface features reducing in cross sectional area distally from said support structure to provide a lowest cross sectional area at said distal end,
said recessive phase material supporting and separating said surface features and defining a contiguous recessed surface area between said surface features,
at least two of said protrusive features being characterized as optical waveguides, wherein said protrusive phase and said recessive phase are differentially etchable by an etchant.

2. An optical component in accordance with claim 1 wherein said recessive phase and said protrusive phase are arranged in an ordered array.

3. An optical component in accordance with claim 1 wherein said sharp surface feature comprises a plurality of protrusions of said protrusive phase.

4. An optical component in accordance with claim 3 wherein at least a portion of said recessive phase is characterized as an optical waveguide.

5. An optical component in accordance with claim 1 wherein said recessive phase comprises a first glass, and wherein said protrusive phase comprises a second glass.

6. An optical component in accordance with claim 5 wherein said protrusive phase is characterized by a higher index of refraction than said recessive phase at at least one preselected wavelength of light.

7. An optical component in accordance with claim 1 wherein said recessive phase comprises a material that is reflective at at least one preselected wavelength of light.

8. An optical component in accordance with claim 1 wherein said recessive phase comprises a metallic material.

9. An optical instrument comprising:
an optical component which comprises
a support structure having a first composition including a recessive phase material and a second composition including protrusive phase material,
said protrusive phase material comprising a plurality of discrete, spaced apart optical fibers extending from a proximal end of said support structure to distal end of said support structure, wherein each of said discrete, spaced apart optical fibers comprises a sharp surface feature extending from said distal end of said support structure, each of sharp surface features comprising a distal end opposite said support structure, integrated with said support structure, and protruding distally from a surface of said distal end of said support structure, each of said sharp surface features reducing in cross sectional area distally from said support structure to provide a lowest cross sectional area at said distal end,
said recessive phase material supporting and separating said surface features and defining a contiguous recessed surface area between said surface features,
at least two of said protrusive features being characterized as optical waveguides,
wherein said protrusive phase and said recessive phase are differentially etchable by an etchant;
a light source for illuminating a sample so that light interacts with the sample and enters said optical component through said protrusive features at said distal end of said optical component; and
a detector in optical communication with a proximal end of said optical component for converting a light signal propagated through said optical component into an electrical signal.

10. An optical instrument in accordance with claim 9 further comprising an electrical component for supplying power to said instrument.

11. An optical instrument in accordance with claim 9 further comprising an electrical component for controlling said instrument.

12. An optical instrument in accordance with claim 9 further comprising an electrical component for processing the electrical signal into data.

13. An optical instrument in accordance with claim 12 further comprising an electrical component for displaying the data.

14. An optical instrument in accordance with claim 9 further comprising a support frame for supporting at least said optical component.

15. An optical component in accordance with claim 1 further comprising nanoparticles coated on an end of said optical component comprising said plurality of spaced apart surface features.

16. An optical instrument in accordance with claim 9 further comprising nanoparticles coated on an end of said optical component comprising said plurality of spaced apart surface features.

* * * * *